United States Patent [19]
Strobl

[11] Patent Number: 5,528,095
[45] Date of Patent: Jun. 18, 1996

[54] PERMANENT MAGNET ROTOR

[75] Inventor: Georg Strobl, Stuttgart, Germany

[73] Assignee: Johnson Electric S.A., Switzerland

[21] Appl. No.: 327,275

[22] Filed: Oct. 21, 1994

[30] Foreign Application Priority Data

Oct. 22, 1993 [GB] United Kingdom ............... 9321785

[51] Int. Cl.$^6$ ................................................. H02K 21/12
[52] U.S. Cl. ........................... 310/156; 310/43; 310/44; 310/261
[58] Field of Search ............................ 310/156, 43, 44, 310/261, 262, 89, 91

[56] References Cited

U.S. PATENT DOCUMENTS

| | | | |
|---|---|---|---|
| 2,897,384 | 7/1958 | Muller | 310/261 |
| 3,258,623 | 6/1966 | Phelon et al. | 310/156 |
| 4,594,525 | 6/1986 | Stokes | 310/156 |

FOREIGN PATENT DOCUMENTS

| | | |
|---|---|---|
| 1614183 | 5/1970 | Germany. |
| 3137981 | 4/1983 | Germany. |
| 2007146 | 5/1979 | United Kingdom. |

OTHER PUBLICATIONS

Patent Abstracts of Japan, vol. 12, No. 362 (e–663)(3209), Abstract No. JP–A–63 114 550, May 19, 1988.
European Search Report dated Feb. 14, 1994.

*Primary Examiner*—R. Skudy
*Attorney, Agent, or Firm*—Ostrolenk, Faber, Gerb & Soffen

[57] ABSTRACT

A permanent magnet rotor for an electric motor has a shaft, a coupler mounted on the shaft, a flux ring fitted to the coupler and located within a ring magnet. The flux ring is a split ring having a nominal outside diameter greater than the inside diameter of the magnet and is keyed to the coupler.

22 Claims, 2 Drawing Sheets

5,528,095

PERMANENT MAGNET ROTOR

BACKGROUND OF THE INVENTION

This invention relates to an electric motor and in particular to a permanent magnet rotor for an electric motor.

Permanent magnet rotors are well known and are used, for example, in brushless D.C. motors and sychronous motors. Various methods have been tried to attach the magnets to the rotor. A common construction is to use a ring magnet rather than individual bar magnets to overcome centrifugal forces. These are usually sintered magnets formed as simple rings with ground internal and external surfaces to provide accurate diameters.

The return path for the magnetic field in the rotor is provided by a flux ring made from an iron tube, a stamped stack of steel laminations or a solid ring. The flux ring needs to have a highly accurate outside diameter to match the inside diameter of the magnet as the magnet is a press fit on the flux ring. If the interference is too great, the magnet may crack. If the interference is too little, the magnet may be loose on the flux ring resulting in slippage under load.

It is known to use a plastic coupler to connect the flux ring to the motor shaft. The coupler is usually in the form of a solid sleeve. Again, the external diameter of the coupler needs to be accurate to ensure a good fit and reliable transfer of torque between the magnet and the shaft. This is a particular problem when the motor is designed or required to operate over a wide temperature range due to the differences in thermal expansion of the various parts.

SUMMARY OF THE INVENTION

This problem is overcome in the present invention by providing a split flux ring having a nominal outside diameter greater then the inside diameter of the magnet and detent means between the flux ring and the coupler. In this manner, the flux ring is compressed to fit inside the magnet and due to its resilience provides a sprung interference fit able to tolerate reasonable variations in the inside diameter of the magnet while providing sufficient friction to reliably transfer torque between the magnet and the shaft. The detent means locates the flux ring on the coupler and also allows the coupler to tolerate variations in the diameter of the flux ring due to manufacturing tolerances and variations in the diameter of the magnet while reliably transferring the torque between the magnet and the shaft.

Accordingly, the present invention provides a permanent magnet rotor for an electric motor, comprising a ring magnet, a split flux ring disposed within the magnet, a shaft for the rotor, a coupling connecting the flux ring to the shaft and detent means locating the flux ring with respect to the coupling.

Preferably, the flux ring is a split rolled steel ring as this provides a good flux return path for the magnetic field and has good resilience to accommodate the variations in the inside diameter of the magnet while being easy to manufacture.

Preferably, the coupler is of plastics material as this is easy to manufacture and molded configurations are preferred, although stamped steel laminations could be used.

Preferably, the coupler has a central boss fitted to the shaft and an outer annular sleeve connected co-axially to the boss by radially extending webs. This construction is not only lighter and uses less material but also gives the coupler a degree of compressibility which is enhanced by sweeping the webs so that they do not extend perpendicularly to the axis of the rotor.

In addition, ribs may be formed along the external surface of the sleeve for receiving the flux ring. The ribs are placed at circumferential positions midway between adjacent webs. This provides the coupler with greater resilience by utilising the flexing of the sleeve between the webs.

Preferably, the detent means comprises a projection on the coupler which cooperates with a cutout portion on the flux ring. This is particularly simple to construct if the coupler is molded and is easy to assemble especially if the cutout portion is formed along the split in the flux ring. The projection engages the cutout portion to locate the ring on the coupling and aids the transfer of torque between the flux ring and the coupler should the friction between the flux ring and the coupler alone be not sufficient. When the flux ring starts to move with respect to the coupler, the projection bears against the edge of the cutout portion to prevent relative movement.

Usually the height of the projection would be equal to or less than the thickness of the flux ring. Where the inside surface of the magnet has an appropriate recess to accommodate the projection, the projection may be higher.

Although the friction between the magnet and the flux ring would normally be sufficient to retain the magnet on the flux ring, tabs may be provided on the axial ends of the flux ring to locate the magnet axially on the flux ring. For higher torque requirements, the tabs may locate in recesses formed in the magnet to help prevent slippage.

The invention also relates to an electric motor incorporating a permanent magnet rotor as described above.

BRIEF DESCRIPTION OF THE DRAWINGS

Preferred embodiments of the invention will now be described, by way of example only, with reference to the accompanying drawings, in which.

DETAILED DESCRIPTION OF PREFERRED EMBODIMENTS

Figure 1:
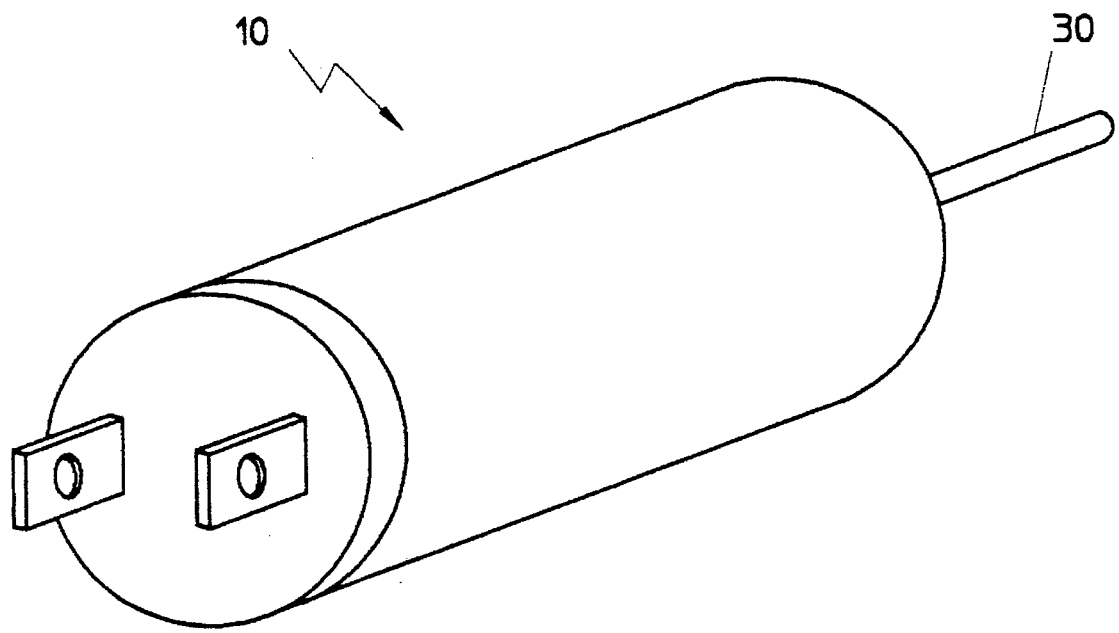
FIG. 1 illustrates a motor according to the invention.
Figure 2:
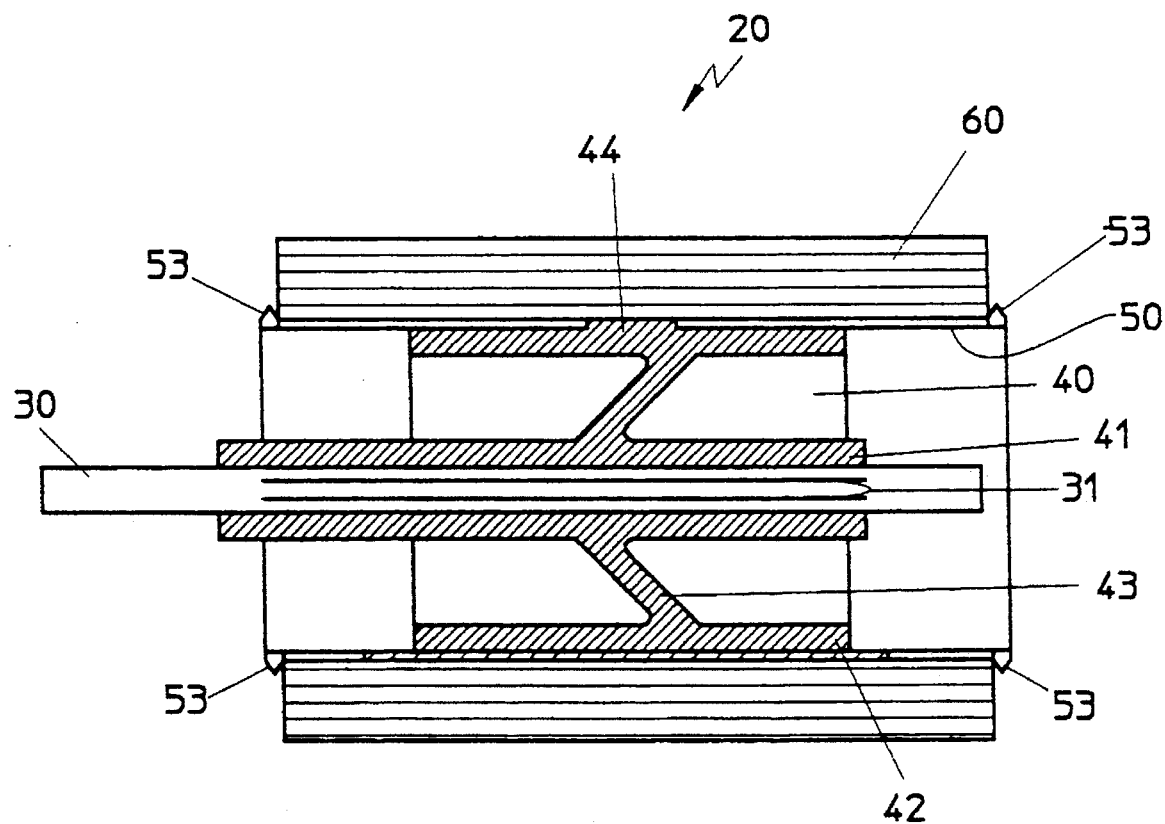
FIG. 2 is a longitudinal sectional view of a rotor according to the invention.
Figure 3:
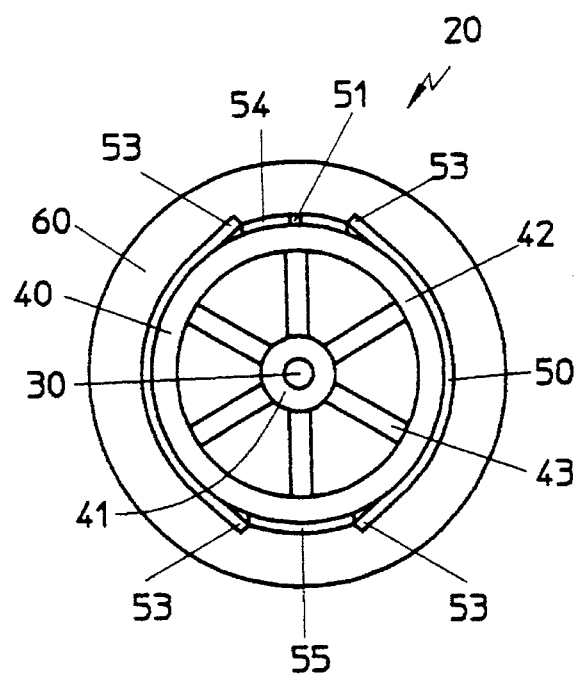
FIG. 3 is an end view of the rotor of FIG. 2.

FIG. 1 illustrates a motor 10, such as a brushless d.c. motor, incorporating within the housing a permanent magnet rotor 20 as shown in section in FIG. 2. The rotor 20 comprises a shaft 30, a magnet holder or coupler 40, a flux ring 50 and a ring magnet 60.

The shaft 30 is provided with knurls 31 to aid the adhesion between the shaft and the coupler 40.

The function of the coupler 40 is to support the magnet 60 and/or flux ring 50 co-axially with the axis of rotation of the rotor 20 and the shaft 30 and to transfer torque from the magnet 60 (or flux ring 50) to the shaft. It is a single piece, molded plastic material item having a central boss 41 which is mounted on the shaft 30. Around the central boss is an outer annular sleeve 42. Radially extending webs 43 connect the sleeve to the boss 41. The webs 43 are swept or shaped so as not to extend perpendicularly to the axis of the rotor 20.

This allows the webs 43 to bend resiliently when the sleeve 42 is deformed by radial compression forces such as occurs when the magnet and flux ring are fitted to the coupler 40. The bending of the webs 43 helps to absorb the compression forces.

A projection 44 is formed on the outer surface of the sleeve 42. The projection 44 forms part of the detent means which locates the flux ring 50 with respect to the coupler 40. Its function will be described in more detail later. In the preferred embodiment the height of the projection is the same or slightly less than the thickness of the flux ring 50.

Figure 4:
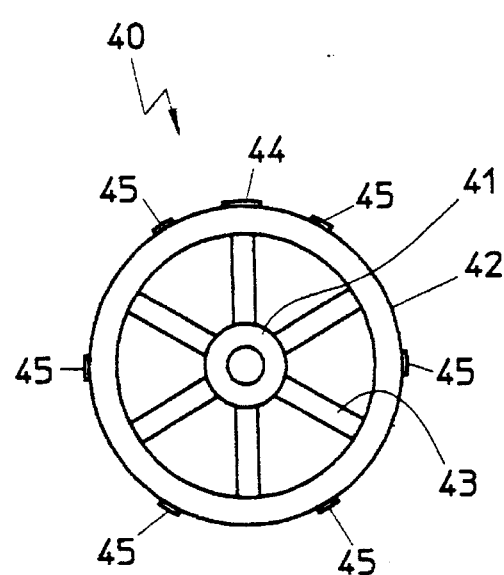
FIG. 4 is an end view of a coupler forming part of the rotor of FIG. 2.

While the flux ring 50 may bear directly onto the outer surface of the sleeve 42, it is preferred that the flux ring bears on ribs 45 formed along the outer surface of the sleeve. The ribs, as shown in FIG. 4, are circumferentially spaced around the sleeve 42 midway between adjacent webs 43.

Figure 5:
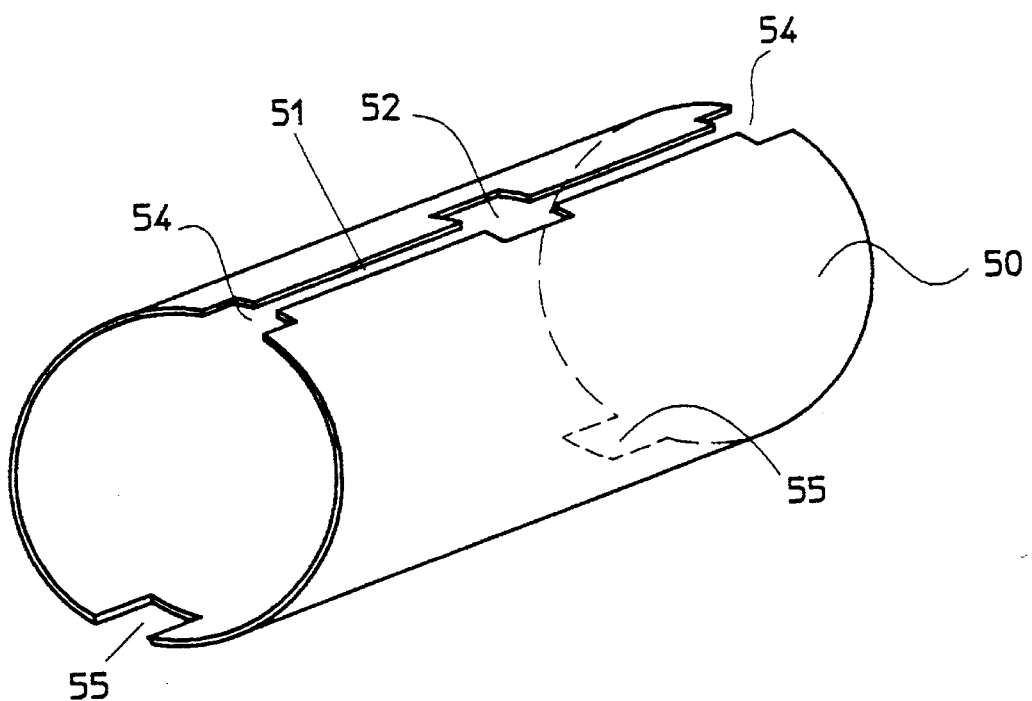
FIG. 5 illustrates a flux ring forming part of the rotor of FIG. 2.

The flux ring 50, as more clearly shown in FIG. 5, is stamped from a sheet of steel and rolled into a ring having a longitudinal split 51. Midway along the split is a cutout portion 52, forming a hole in the ring. This cutout portion forms part of the detent means which locates the flux ring 50 with respect to the coupler 40. The cutout portion 52 co-operates with the projection 44 on the sleeve 42 to prevent relative movement between the flux ring 50 and the coupler 40. The projection 44 is located within the hole formed by the cutout portion 52 and when the flux ring 50 tries to move relative to the coupler 40, the projection 44 butts against the edge of the cutout portion 52, preventing relative movement.

The flux ring 50 is magnetically attracted to the magnet 60 and this helps to retain the magnet stationary with respect to the flux ring 50. Also, the flux ring is made by rolling a flat sheet into a ring with a longitudinal slit. The ring is made with a natural or nominal outside diameter which is greater than the inside diameter of the magnet 60 so that the ring 50 is compressed by the magnet. The natural resilience or tendency of the ring 50 to return to its original diameter creates further friction between the magnet 60 and the flux ring 50.

For some applications, it may be advantageous to provide means for axially locating the magnet 60 with respect to the flux ring/coupler. To this end, tabs 53 are provided on the axial ends of the flux ring 50. The tabs 53 bear against the ends of the magnet to axially locate the magnet 60. Recesses (not shown) may be provided in the magnet 60 to receive the tabs 53. Co-operation between the tabs and recesses can provide additional resistance to relative movement between the magnet and the flux ring which may be required under higher than normal torque conditions.

The tabs 53 are formed by deforming corners of cutout sections in the axial ends of the flux ring. Two cutout sections in each end of the ring are shown in FIG. 5. One cutout section 54 is formed along the split 51 and is relatively small. The other cutout section 55 is formed diametrically opposite the split and is larger than the first section 54 to compensate for the split and the cutout portion 52 to keep the ring balanced.

What is claimed is:

1. A permanent magnet rotor for an electric motor, the rotor comprising:

a ring magnet having an inside diameter;

a split flux ring disposed within the central magnet and having a nominal outside diameter greater than the inside diameter of the ring magnet;

a shaft for the rotor;

a coupler connecting the flux ring to the shaft; and detent means locating the flux ring with respect to the coupler.

2. A rotor as defined in claim 1, wherein the flux ring is a split rolled steel ring.

3. A rotor as defined in claim 1, wherein the detent means comprises a projection formed on the coupler co-operating with a cutout portion on the flux ring.

4. A rotor as defined in claim 1, wherein the central coupler is a plastic material having a central boss mounted on the shaft and an outer annular sleeve connected to the central boss by radially extending webs.

5. A rotor as defined in claim 4, wherein the radially extending webs do not extend perpendicularly to the shaft.

6. A rotor as defined in claim 4, wherein ribs are formed on an outer surface of the sleeve and are circumferentially spaced midway between adjacent webs.

7. A rotor as defined in claim 1, wherein tabs are formed on each axial end of the flux ring to axially locate the ring magnet with respect to the flux ring.

8. A permanent magnet rotor for an electric motor, the rotor comprising:

an elongated shaft extending along an axis of rotation of the rotor;

a plastic coupler fitted to the shaft and having a central boss, an outer annular sleeve connected to the central boss by radially extending swept webs, ribs extending along an outer surface of the sleeve at circumferentially spaced locations midway between adjacent webs and a projection formed on the outer surface of the sleeve;

a rolled steel flux ring having axial ends and being fitted to the coupler and having a longitudinal split, a nominal outside diameter, a cutout portion forming a hole in the ring and cooperating with the projection on the coupler to locate the flux ring with respect to the coupler, and tabs formed by deforming corners of cutout sections in the axial ends of the flux ring; and a sintered ring magnet fitted to the flux ring and having an inside diameter smaller than the nominal outside diameter of the flux ring to cause the flux ring to be compressed and being located on the flux ring by the tabs.

9. An electric motor, comprising:

a) a housing; and b) a permanent magnet rotor located in the housing, the rotor including:

1) an elongated shaft extending along an axis of rotation of the rotor;

2) a plastic coupler fitted to the shaft and having a central boss, an outer annular sleeve connected to the central boss by radially extending swept webs, ribs extending along an outer surface of the sleeve at circumferentially spaced locations midway between adjacent webs and a projection formed on the outer surface of the sleeve;

3) a rolled steel flux ring having axial ends and being fitted to the coupler and having a longitudinal split, a nominal outside diameter, a cutout portion forming a hole in the ring and cooperating with the projection on the coupler to locate the flux ring with respect to the coupler, and tabs formed by deforming corners of cutout sections in the axial ends of the flux ring; and 4) a sintered ring magnet fitted to the flux ring and having an inside diameter smaller than the nominal outside diameter of the flux ring to cause the flux ring to be compressed and being located on the flux ring by the tabs.

10. A permanent magnet rotor for an electric motor, the rotor comprising:

a ring magnet having an inside diameter;

a resilient split flux ring disposed within the magnet and having a nominal outside diameter greater than the inside diameter of the ring magnet;

a shaft for the rotor; and a coupler connecting the flux ring to the shaft.

11. A rotor as defined in claim 10, further including a detent cooperating with a recess for locating the flux ring with respect to the coupler.

12. A rotor as defined in claim 11, wherein the recess is formed in the flux ring and the detent is formed in the coupler.

13. A rotor as defined in claim 12, wherein the recess is located in the area where the flux ring is split.

14. A rotor as defined in claim 11, wherein the recess and detent cooperate to prevent the slip ring from slipping relative to the coupler.

15. A rotor as defined in claim 11, wherein the detent is a projection formed on the coupler and the recess is a cut-out portion on the flux ring.

16. A rotor as defined in claim 10, wherein the flux ring is a split rolled steel ring.

17. A rotor as defined in claim 10, wherein the coupler is a plastic material having a central boss mounted on the shaft and an outer sleeve connected to the central boss by radially extending webs.

18. A rotor as defined in claim 17, wherein the radially extending webs do not extend perpendicular to the shaft.

19. A rotor as defined in claim 17, wherein ribs are formed on an outer surface of the sleeve and are circumferentially spaced midway between adjacent webs.

20. A rotor as defined in claim 17, wherein the radially extending webs are swept or shaped so as not to extend perpendicular to the axis of the rotor.

21. A rotor as defined in claim 17, wherein webs bend resiliently when the sleeve is deformed by radial compression forces.

22. A rotor as defined in claim 10, wherein tabs are formed on each axial end of the flux ring to axially locate the ring magnet with respect to the flux ring.

\* \* \* \* \*